United States Patent
Nagahama et al.

(10) Patent No.: US 7,480,097 B2
(45) Date of Patent: Jan. 20, 2009

(54) LIGHT DIFFUSION SHEET AND METHOD OF PRODUCING THE LIGHT DIFFUSION SHEET, AND SCREEN

(75) Inventors: Tsutomu Nagahama, Miyagi (JP); Hiroyuki Kiso, Miyagi (JP); Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 265 days.

(21) Appl. No.: 11/195,931

(22) Filed: Aug. 2, 2005

(65) Prior Publication Data

US 2006/0040204 A1 Feb. 23, 2006

(30) Foreign Application Priority Data

Aug. 4, 2004 (JP) ............................. P2004-227543

(51) Int. Cl.
*G03B 21/56* (2006.01)
*G03B 21/60* (2006.01)

(52) U.S. Cl. ...................... 359/449; 359/454; 359/460

(58) Field of Classification Search ................. 359/449, 359/443, 454, 460
See application file for complete search history.

(56) References Cited

U.S. PATENT DOCUMENTS

| 6,894,835 B2 * | 5/2005 | Ohsako et al. ............. 359/449 |
| 2003/0169499 A1 | 9/2003 | Bourdelais et al. |
| 2003/0169504 A1 * | 9/2003 | Kaminsky et al. ........... 359/622 |
| 2003/0170442 A1 | 9/2003 | Kaminsky et al. |
| 2004/0150883 A1 | 8/2004 | Shimoda et al. |
| 2005/0184412 A1 * | 8/2005 | Kiso et al. ................... 264/2.5 |
| 2005/0207007 A1 * | 9/2005 | Shimoda et al. ............. 359/449 |

FOREIGN PATENT DOCUMENTS

| JP | 53-51755 | 5/1978 |
| JP | 03-142401 | 6/1991 |
| JP | 07-199356 | 8/1995 |
| JP | 07-248537 | 9/1995 |
| JP | 2001100621 | 4/2001 |
| JP | 2001-324606 | 11/2001 |
| JP | 2002-090508 | 3/2002 |
| JP | 2002-236203 | 8/2002 |
| JP | 2003-270725 | 9/2003 |
| JP | 2003-294904 | 10/2003 |

* cited by examiner

*Primary Examiner*—Diane I Lee
*Assistant Examiner*—Magda Cruz
(74) *Attorney, Agent, or Firm*—Bell, Boyd & Lloyd LLP

(57) ABSTRACT

A light diffusion sheet, a method of producing a light diffusion sheet, and a screen using the light diffusion sheet, are provided. The method of producing a light diffusion sheet includes transferring an uneven form of a surface of a mold to form a light diffusion layer having an uneven surface; and repeating the transferring step twice or more to stack two layers or more of the light diffusion layers on a substrate.

10 Claims, 6 Drawing Sheets

LIGHT DIFFUSION SHEET AND METHOD OF PRODUCING THE LIGHT DIFFUSION SHEET, AND SCREEN

CROSS REFERENCE TO RELATED APPLICATION

The present application claims priority to Japanese Patent Application No. 2004-227543 filed in the Japan Patent Office on Aug. 4, 2004, the entire contents of which being incorporated herein by reference.

BACKGROUND

The present invention relates to a light diffusion sheet and a method of producing the same as well as a screen using the light diffusion sheet.

In recent years, large-size screen display devices, such as liquid crystal displays, plasma displays, and front or rear projection displays, have attracted attention, and those for not only commercial use but also domestic use are spreading. Especially, the projection type display devices have drawn great attention since large-size screen display devices may be achieved at relatively low cost.

The projection type display device employs a method of image projection in which a ray of light emitted from a light source is modulated by a device, such as a transmissive liquid crystal panel, a liquid crystal on silicon (LCOS), a digital micromirror device (DMD), or a grating light valve (GLV), to form an image light, and the image light is passed through optics system, such as a reflector or a lens, and projected on a screen.

The screen for projector is roughly classified into a screen for front projector such that image light is projected from the front side of the screen to see the reflected light of the projected light by the screen, and a screen for rear projector such that image light is projected from the back side of the screen to see the transmitted light through the screen from the front side of the screen. The screens of any types are required to have excellent recognizability and a large viewing angle.

Therefore, in the screens of any types, generally, a light diffusion sheet for scattering light is formed on the surface of the screen, and the light diffusion sheet makes image light be uniformly diffused and emitted from the entire effective region of the screen.

As the light diffusion sheet, two types of diffusion sheets roughly classified, i.e., an isotropic diffusion sheet and an anisotropic diffusion sheet are generally known, and the anisotropic diffusion sheet has attracted attention because it is able to diffuse incident light in a predetermined amount only in the desired direction to improve the luminance. Particularly, when the diffusion sheet is used in a projector image screen, the visual field in the horizontal direction is more important than the visual field in the vertical direction, and therefore the development of an anisotropic diffusion sheet having strong diffusing power in the horizontal direction is in progress.

As a method of producing an anisotropic light diffusion sheet, there have in the past been a method in which a speckle pattern, which is caused when a roughened surface is irradiated with a coherent light flux, is formed in a photosensitive resin to produce a light diffusion sheet (see, for example, Japanese Patent Application Publication No. Sho 53-51755, and Japanese Patent Application Publication No. 2001-100621), a method in which a mask is prepared and burnt on a photosensitive resin to produce a light diffusion sheet, and a method in which the surface of a mold base material, such as a metal or a resin, is directly ground by mechanical processing to prepare a mold having a finely uneven surface formed, and the surface form of the mold is transferred to an ultraviolet curing resin or the like to produce a light diffusion sheet.

In addition, there have been a method in which a composition comprising resin particles dispersed in a resin binder is applied to a transparent substrate to produce a light diffusion sheet, and a method in which a mold having an uneven surface is prepared by subjecting a mold base material to sandblasting, and the surface form of the mold is transferred to an ultraviolet curing resin or the like to produce a light diffusion sheet.

By the method in which the form of a mold is transferred to a sheet, a light diffusion sheet having specific diffusion properties may be mass-produced at a low cost; however, the diffusion performance required for the screen varies depending on the arrangement or ambient light intensity in the space in which the display device is placed and hence light diffusion sheets having various diffusion performance are needed, and therefore manufacturing apparatuses exclusive to the respective diffusion sheets having various properties and the corresponding molds must be prepared.

The preparation of the molds exclusive to the respective diffusion sheets has shortcomings per mold production method. For example, in the method in which a speckle interference or mask pattern is burnt on a photosensitive resin to produce a light diffusion sheet, when a plurality of light diffusion sheets are produced, a mold for duplicating light diffusion sheets from the photosensitive resin must be prepared, and the exposure of the photosensitive resin requires an exposure time as long as several hours to several days per $m^2$. Further, after the exposure, a step for duplicating light diffusion sheets using the photosensitive resin, a step for imparting electrical conduction, a step for electroforming, and the like are needed, and thus a considerably prolonged time and high cost are required in the production of the mold for light diffusion sheet.

In the method in which a light diffusion sheet is produced using a mold prepared by mechanically grinding the surface of a mold base material, there are issues in that the precision of grinding is not satisfactory, the tools are damaged during the grinding, a very long time is required for the grinding, and the facility for the grinding is large.

On the other hand, in the method in which a light diffusion sheet is produced using a mold prepared by sandblasting, a long time or high cost is not required for the production of the mold, but the issue in that the apparatuses for producing the respective molds having various properties are needed is not solved.

In the light diffusion sheet produced by transferring the form of a mold to a sheet, a defect may be caused in part of the uneven form of the surface, and, in this case, reflection or transmission of light occurs at the defect site without diffusion. When a screen is formed using such a light diffusion sheet, strong reflection or transmission occurs only at the defect site to cause the light to glare, leading to an issue in which the glaring light is dangerous when using a high power light source, such as a laser.

SUMMARY

It is desirable to provide a light diffusion sheet, which is free of non-diffuse reflection or transmission due to the defect and enables easier control of the diffusion performance, a method of producing a light diffusion sheet, which may produce the light diffusion sheet using the same apparatus, and a screen using the light diffusion sheet. In view of the above shortcomings accompanying the technique in the past, the present invention has been achieved.

In an embodiment of the present invention, there is provided a light diffusion sheet which includes: a substrate; and two layers or more of light diffusion layers each having an uneven surface stacked on the substrate.

It is preferred that the light diffusion layers have the same uneven form.

It is preferred that the refractive indexes of the adjacent light diffusion layers are different from one another.

It is preferred that a high refractive-index light diffusion layer and a low refractive-index light diffusion layer are alternately stacked, the low refractive-index light diffusion layer having a refractive index lower than that of the high refractive-index light diffusion layer.

In this case, it is preferred that the diffusion angle of the light diffusion sheet is controlled by adjusting the number of the stacked light diffusion layers and/or a difference in refractive index between the adjacent light diffusion layers or both. It is preferred that the number of the stacked layers is 3 or more.

It is preferred that an outermost layer of the light diffusion layer is a low refractive-index layer, or an outermost layer of the light diffusion layer is a high refractive-index layer.

Further, it is preferred that each difference in refractive index between the adjacent light diffusion layers is 0.07 or more.

In an embodiment of the present invention, there is provided a light diffusion sheet which includes: a base material having a function to transmit light and diffuse the transmitted light; and a light diffusion layer, formed on the base material, having an uneven surface.

It is preferred that two layers or more of the light diffusion layers are stacked on the base material.

In an embodiment of the present invention, there is provided a method of producing a light diffusion sheet, including the steps of transferring an uneven form of the surface of a mold to form a light diffusion layer having an uneven surface, and repeating the transferring step twice or more to stack two layers or more of the light diffusion layers on a substrate.

It is preferred that a same mold is used for stacking the light diffusion layers.

It is preferred that the light diffusion layers are formed with a high refractive-index optical material and a low refractive-index optical material whose refractive index is lower than that of the high refractive-index optical material and alternately stacked.

In this case, it is preferred that the diffusion angle of the light diffusion sheet is controlled by adjusting the number of the light stacked diffusion layers and/or a difference in refractive index between the adjacent light diffusion layers or both.

In an embodiment of the present invention, there is provided a screen which includes: a substrate; a reflective layer; and any one of the above-stated light diffusion sheets, wherein the reflective layer and the light diffusion sheet are successively formed on the substrate.

In an embodiment of the present invention, there is provided a screen which includes: a transparent substrate; and any one of the above-stated light diffusion sheets formed on the transparent substrate, wherein the screen diffuses projection light from the light diffusion sheet, the projection light entering the screen from a side of the transparent substrate opposite to the surface on which the light diffusion sheet is formed.

The light diffusion sheet according to an embodiment of the present invention is advantageous not only in that glare due to non-diffuse reflection or transmission may be prevented, but also in that the diffusion performance (diffusion angle) may be easily controlled.

By the method of producing a light diffusion sheet according to an embodiment of the present invention, the diffusion performance (diffusion angle) may be controlled while easily preventing glare due to non-diffuse reflection or transmission. In addition, the diffusion performance (diffusion angle) may be controlled using one mold, making easy the application to various uses.

The screen of the present invention is advantageous in that the defect site in the uneven surface of the light diffusion sheet is suppressed, so that a normal image free from non-diffuse reflection may be seen on the screen. Further, an image with uniform and high luminance may be seen, and the image light may be controlled to direct a specific visual field. Particularly, the required viewing angle or luminance varies depending on the size or brightness of lighting of a room in which the screen is placed, but, by employing the present invention which may offer inexpensive and various light diffusion sheets free of defects, the requirements may be met.

Additional features and advantages are described herein, and will be apparent from, the following Detailed Description and the figures.

DETAILED DESCRIPTION

The present invention relates to a light diffusion sheet and a method of producing the same as well as a screen using the light diffusion sheet.

The factors in determining the diffusion properties of a light diffusion sheet utilizing surface roughness are the form of the surface and a refractive index. Therefore, for producing light diffusion sheets having different diffusing power using the same mold having one type of surface form, the refractive index of the diffusion sheet must be changed. However, merely changing the refractive index of the diffusion sheet has limitation of controlling the diffusion performance, making it difficult to meet the various requirements.

Figure 1:
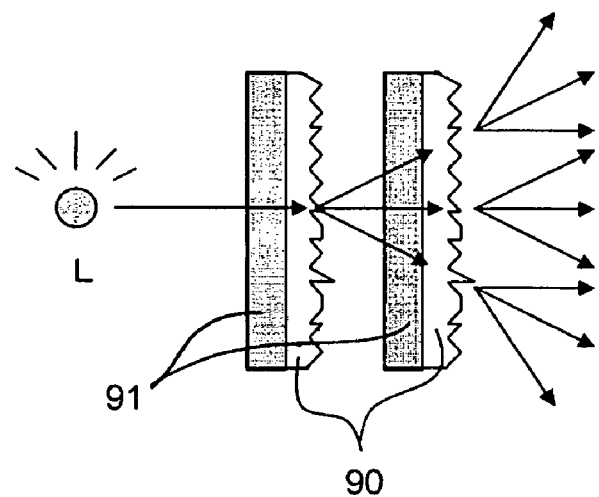
FIG. 1 is a view for explaining that an image formed using two conventional light diffusion sheets stacked becomes blurred.

In addition, while making studies on the light diffusion sheet of the present invention, the present inventors have conducted an experiment such that, as shown in FIG. 1, two sets of conventional light diffusion sheets formed on transparent substrates 91 are stacked. As a result, it has been found that the non-diffuse reflection or transmission due to the defect site in the uneven surface may be suppressed or the diffusion angle may be changed, but a space present between the first diffusion sheet and the second diffusion sheet causes the image light diffused by the first diffusion sheet to be further diffused at the second diffusion sheet, and hence shortcomings arise in that, when the light diffusion sheets stacked are used in a display device, the resultant image becomes blurred, making it difficult to obtain an image with high resolution.

In this situation, the present inventors have made extensive and intensive studies with a view toward solving the issue, and, as a result, they have found that, by stacking light diffusion sheets having different refractive indexes, a light diffusion sheet having diffusing power covering a wide variety of ranges may be formed, and thus the present invention has been completed.

Hereinbelow, the light diffusion sheet according to an embodiment of the present invention will be described.

Figure 2:
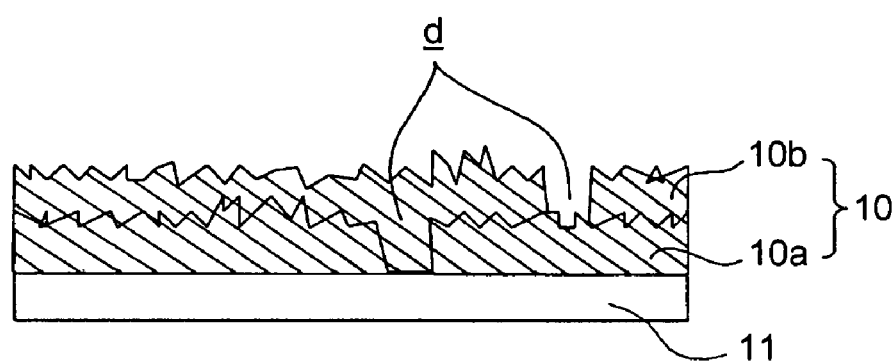
FIG. 2 is a cross-sectional view showing the construction of a light diffusion sheet according to the first embodiment of the present invention.

FIG. 2 is a cross-sectional view showing the construction of a light diffusion sheet according to the first embodiment of the present invention.

As shown in FIG. 2, a light diffusion sheet 10 includes a substrate 11, and light diffusion layers 10a, 10b each having an uneven surface stacked on the substrate.

Each of the light diffusion layers 10a, 10b is an optical film having the surface controlled by an uneven form, e.g., a spherical, rectangular, or polygonal form. The uneven surface may be formed by transferring a finely uneven form engraved in a mold to the surface of an optical material, for example, the uneven surface may be formed by profiling a thermoforming plastic film by pressing the mold.

Alternatively, a light diffusion layer having a desired uneven surface may be obtained by applying a radiation curing resin to the mold and curing it and removing the cured resin from the mold. It is preferred that the radiation curing resin to be used has optical transparency, and various resins, such as an acrylic resin, a polyester resin, polyvinyl chloride, polyurethane, and a silicone resin, may be used, but the resin is not particularly limited to these resins. A thermoforming plastic or radiation curing resin containing fine particles for controlling the refractive index may be used. The thickness of each of the light diffusion layers 10a, 10b may be a thickness such that an uneven surface may be surely obtained, and is preferably 2 μm or more.

In each of the light diffusion layers 10a, 10b, a bead layer including a binder and beads may be formed to achieve an uneven surface.

Examples of beads include plastic beads (e.g., acrylic beads, polystyrene beads, and polycarbonate beads) and glass beads. With respect to the diameter of the beads, there is no particular limitation, but, from the viewpoint of obtaining excellent efficiency of the reflection of light, the diameter may be about 1 to 100 μm, and a mixture of beads having different diameters is preferably used. The color of the beads is preferably white from the viewpoint of obtaining excellent reflection efficiency, and, as a colored material for the white beads, a white inorganic pigment, such as titanium oxide, talc, or zinc oxide, may be used, and, from the viewpoint of achieving excellent reflection efficiency of the final product, titanium dioxide is especially preferred. When transparent beads and colored beads are used in combination, it is preferred that the weight ratio between them is in the range of from 1:99 to 99:1 from the viewpoint of achieving excellent reflection effect for a ray of light.

As the binder, for example, a synthetic resin, such as an acrylic copolymer resin or an urethane resin, may be used. With respect to the respective amounts of the beads and binder combined, from the viewpoint of achieving excellent light reflection effect and the like, it is preferred that the amount of the beads is 5 to 95 parts by weight, relative to 100 parts by weight of the binder.

For imparting flame retardancy to the base material film, binder, and beads, a flame retardant, e.g., triphenyl phosphate or polycresyl phosphate may be further incorporated.

With respect to the state of the beads disposed in the bead layer, from the viewpoint of achieving excellent light diffusion effect and the like, preferred is a state in which beads embedded in the binder and beads partially embedded in the binder are present and the beads are dispersed on the surface of the base material film or dispersed so as to substantially cover the surface of the base material film.

With respect to the number of the stacked light diffusion layers 10a, 10b, there is no particular limitation as long as it is 2 or more, and, even when the number of the stacked layers is 2, an effect of making up for the defect site in the uneven surface to suppress glare may be obtained. The number of the stacked layers may be determined depending on the desired effect of suppressing glare.

In the formation of the light diffusion layers 10a, 10b, the uneven surface of the same form may be formed using the same mold.

The light diffusion sheet 10 is used as an optical device, and hence needs to efficiently utilize light from a light source, and preferably has high light transmittance, and preferably has a total light transmittance of 80% or more.

By virtue of having the above-described construction, the probability of overlapping of the defect sites d in the uneven surfaces of the light diffusion layers 10a, 10b is very low, making it possible to prevent glare due to non-diffuse reflection or transmission. A difference in refractive index is not necessarily caused between the light diffusion layers, and light diffusion layers having the same refractive index may be stacked.

Figure 3:
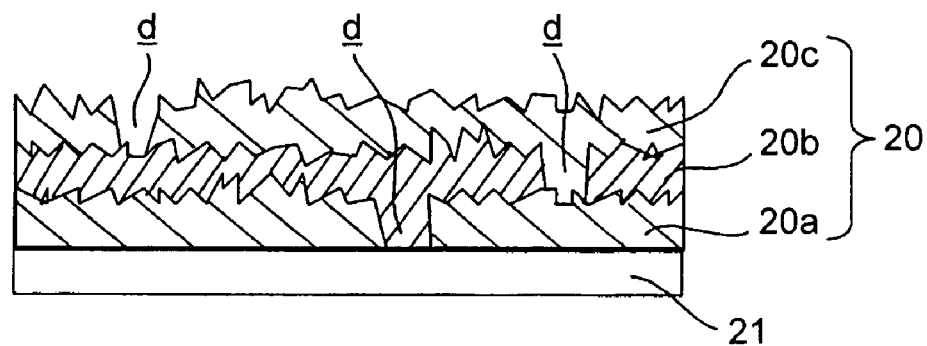
FIG. 3 is a cross-sectional view showing the construction of a light diffusion sheet according to the second embodiment of the present invention.

The construction of a light diffusion sheet according to the second embodiment of the present invention is shown in FIG. 3.

As shown in FIG. 3, a light diffusion sheet 20 includes a substrate 21, and light diffusion layers 20a, 20b, 20c each having an uneven surface stacked on the substrate, wherein the refractive indexes of the adjacent light diffusion layers, i.e., the light diffusion layers 20a and 20b or the light diffusion layers 20b and 20c are different from one another. It is essential that each of the light diffusion layers 20a, 20b, 20c has a finely uneven surface, and, by stacking light diffusion layers each having a smooth surface on one another, the effect aimed at by the present invention may not be achieved.

This is not only for suppressing glare due to the defect site in the uneven surface but also for controlling the diffusion angle.

In the light diffusion sheet 20, a difference in refractive index may be caused at the individual interfaces between the light diffusion layers. Specifically, the light diffusion sheet may include light diffusion layers having different refractive indexes, e.g., three types or more of light diffusion layers having different refractive indexes, which layers are stacked on one another, but the light diffusion sheet preferably includes two types or more of light diffusion layers having different refractive indexes, e.g., a high refractive-index light diffusion layer and a low refractive-index light diffusion layer having a refractive index lower than that of the high refractive-index light diffusion layer, which layers are alternately stacked on one another. For example, the light diffusion layers 20a, 20c are individually a high refractive-index light diffusion layer and the light diffusion layer 20b is a low refractive-index light diffusion layer. This makes easy the design and production of the light diffusion sheet 20.

In this case, the diffusion angle may be controlled by selecting the number of the light diffusion layers stacked and/or the difference in refractive index between the adjacent light diffusion layers. In this case, in the formation of the light diffusion layers 20a, 20b, 20c, the uneven surface of the same form may be formed using the same mold, thus advantageously making easy controlling of the diffusion angle by selecting the number of the light diffusion layers stacked and/or the difference in refractive index between the adjacent light diffusion layers.

With respect to the number of the light diffusion layers stacked, there is no particular limitation as long as it is 2 or more, but the number is more preferably 3 or more, and may be selected based on the relationship between the number of the stacked layers and the difference in refractive index between the adjacent light diffusion layers.

It is preferred that each difference in refractive index between the adjacent light diffusion layers is 0.07 or more.

The difference in refractive index between the adjacent light diffusion layers is determined by appropriately selecting the refractive index of each of the high refractive-index light diffusion layer and the low refractive-index light diffusion layer. When the uneven surface of the light diffusion layer is formed by transferring an uneven form of the surface of a mold, the refractive index of the light diffusion layer may be controlled by appropriately selecting the material constituting the light diffusion layer, and a known material for optical film may be used. Alternatively, the materials for optical film shown below may be used.

(1) Material for High Refractive-Index Optical Film

A material for high refractive-index optical film contains fine particles, an organic solvent, a binder which absorbs energy to undergo a curing reaction, and a dispersant.

The fine particles are fine particles of a high refractive-index material to be added for controlling the refractive index of the optical film formed, and examples include oxides of Ti, Zr, Al, Ce, Sn, La, In, Y, Sb, or the like, and alloy oxides of In—Sn or the like. Ti oxide may contain an appropriate amount of an oxide of Al, Zr, or the like for suppressing the photocatalytic action. The fine particles preferably have a specific surface area of 55 to 85 m$^2$/g, more preferably 75 to 85 m$^2$/g. When the specific surface area of the fine particles falls in this range, a dispersion treatment for the fine particles enables the fine particles to have a particle size of 100 nm or less in the material for optical film, thus making it possible to obtain an optical film having a very small haze.

A dispersant for dispersing the fine particles is added in an amount of 3.2 to 9.6×10$^{11}$ mol/m$^2$, based on the fine particles, and, when the amount of the dispersant is smaller than this range, satisfactory dispersibility of the particles in the optical film may not be obtained. On the other hand, when the amount of the dispersant is larger than this range, the volume ratio of the dispersant to the coating film is increased to lower the refractive index of the film, so that the range of the refractive index which may be employed becomes narrow, thus making it difficult to design the optical films stacked.

The amount of the polar functional group which is a hydrophilic group contained in the dispersant is 10$^{-3}$ to 10$^{-1}$ mol/g. When the amount of the functional group is smaller or larger than this range, an effect in respect of dispersion of the fine particles is not exhibited, leading to a lowering of the dispersibility.

The functional groups shown below are effective polar functional groups since they cause no aggregation:

—SO$_3$M, —OSO$_3$M, —COOM, P=O(OM)$_2$, wherein M represents a hydrogen atom or an alkali metal, such as lithium, potassium, or sodium, tertiary amines, and quaternary ammonium salts R$_1$(R$_2$)(R$_3$)NHX, wherein each of R$_1$, R$_2$, and R$_3$ represents a hydrogen atom or a hydrocarbon group, and X represents an ion of halogen element, such as chlorine, bromine, or iodine, or an inorganic or organic ion —OH, —SH, —CN, an epoxy group, etc.

With respect to the site into which the polar functional group is introduced, there is no particular limitation. These dispersants may be used individually or in combination.

The amount of the dispersant or the total amount of the dispersants in the coating film is preferably 20 to 60 parts by weight, more preferably 38 to 55 parts by weight, relative to 100 parts by weight of the fine particles.

It is preferred that the lipophilic group in the dispersant has a weight average molecular weight of 110 to 3,000. When the molecular weight of the lipophilic group is smaller than this range, shortcomings occur in that the dispersant is not satisfactorily dissolved in an organic solvent. On the other hand, when the molecular weight is larger than this range, satisfactory dispersibility in the optical film may not be obtained. The molecular weight of the dispersant is measured by gel permeation chromatography (GPC).

The dispersant may have a functional group which undergoes a curing reaction, together with a binder. When the binder other than the dispersant in the present invention is contained, a polyfunctional polymer having a number of bonding groups, or a monomer is preferred.

For controlling the thickness of the light diffusion layer, the coating composition may be diluted with an organic solvent, and, as the organic solvent, a ketone solvent, such as acetone, methyl ethyl ketone, methyl isobutyl ketone, or cyclohexanone; an alcohol solvent, such as methanol, ethanol, propanol, butanol, or isobutyl alcohol; or an ester solvent, such as methyl acetate, ethyl acetate, butyl acetate, propyl acetate, ethyl lactate, or ethylene glycol acetate, may be used. These organic solvents need not have a purity as high as 100%, and they may contain an impurity, such as an isomer, an unreacted substance, a decomposition product, an oxide, or moisture, in an amount of 20% or less. For applying the coating composition onto a substrate or optical film having low surface energy, it is desired to select a solvent having a lower surface tension, and examples of such solvents include methyl isobutyl ketone, methanol, and ethanol.

Examples of binders, which undergo a curing reaction together with the dispersant, include thermosetting resins, ultraviolet (UV) curing resins, and electron beam (EB) curing resins. Examples of thermosetting resins, UV curing resins, and EB curing resins include polystyrene resins, styrene copolymers, polycarbonate, phenolic resins, epoxy resins, polyester resins, polyurethane resins, urea resins, melamine resins, polyamine resins, and urea-formaldehyde resins. Other polymers having a cyclic (aromatic, heterocyclic, or alicyclic) group may be used. Alternatively, a resin having in its carbon chain fluorine or a silanol group may be used.

A method of advancing the curing reaction of the resin may be any one of irradiation and heat, but, when the curing reaction of the resin is advanced by irradiation of ultraviolet light, it is preferred that the reaction is carried out in the presence of a polymerization initiator. Examples of radical polymerization initiators include azo initiators, such as 2,2'-azobisisobutyronitrile and 2,2'-azobis(2,4-dimethylvaleronitrile); and peroxide initiators, such as benzoyl peroxide, lauryl peroxide, and t-butyl peroctoate. The amount of the initiator used is preferably 0.2 to 10 parts by weight, more preferably 0.5 to 5 parts by weight, relative to 100 parts by weight of the sum of the polymerizable monomers.

The material for high refractive-index optical film undergoes a curing reaction, which is promoted by irradiation or heat, to form an optical film of a high refractive-index type.

(2) Material for Low Refractive-Index Optical Film

A material for low refractive-index optical film is designed as a material for layer having a low refractive index. Examples include fluorine-containing resins, silica, and hollow fine particles, and especially preferred is a film having a refractive index of 1.45 or less.

With respect to the fluorine-containing resin, examples of polymers having a main chain modified with fluorine include perfluoro main chain-type perfluoropolyether, perfluoro side chain-type perfluoropolyether, alcohol-modified perfluoropolyether, and isocyanate-modified perfluoropolyether, and examples of monomers having fluorine include $CF_2=CF_2$, $CH_2=CF_2$, and $CF_2=CHF$, and a polymer obtained by polymerizing or block-polymerizing these monomers may be used.

As examples of polymers having a side chain modified with fluorine, there may be mentioned solvent-soluble polymers having a main chain graft-polymerized, and, as an especially preferred example of the low refractive-index thermoplastic polymer, there may be mentioned polyvinylidene fluoride since it may be handled with ease as a resin which may use a solvent. When polyvinylidene fluoride is used as the low refractive-index thermoplastic polymer, the resultant low refractive-index layer has a refractive index of about 1.4, and, for further lowering the refractive index of the low refractive-index layer, a low refractive-index acrylate, such as trifluoroethyl acrylate, may be added in an amount of 10 to 300 parts by weight, preferably 100 to 200 parts by weight, relative to 100 parts by weight of an ionization radiation curing resin.

As fine particles used as a low refractive-index material, ultra-fine particles of LiF (refractive index: 1.4), $MgF_2$ (refractive index: 1.4), $3NaF.AlF_3$ (refractive index: 1.4), $AlF_3$ (refractive index: 1.4), $SiO_X$ (X: $1.5 \leq x \leq 2.0$)(refractive index: 1.35 to 1.48), or the like may be used.

The material for low refractive-index optical film undergoes a curing reaction to form a low refractive-index optical film having a refractive index lower than that of the high refractive-index light diffusion layer.

In the light diffusion sheet 20, it is preferred that the light diffusion layer constituting the outermost layer is a low refractive-index layer. In this case, the surface reflection of the light diffusion sheet 20 is lowered, and therefore, when the light diffusion sheet is used in a display device, an image having such a high contrast that the black is deep may be obtained.

In the light diffusion sheet 20, it is preferred that the light diffusion layer constituting the outermost layer is a high refractive-index layer. In this case, the difference in refractive index between the surface of the light diffusion sheet 20 and air constituting the interface is large, so that the angle of refraction at the surface is increased, thus making it possible to obtain a larger diffusion angle.

In other words, when a high contrast is needed according to the use of the light diffusion sheet 20, the outermost layer is preferably formed from a lower refractive-index light diffusion layer, and, when a larger diffusion angle is needed, the outermost layer is preferably formed from a higher refractive-index light diffusion layer.

The light diffusion sheet 20 is used as an optical device, and hence needs to efficiently utilize light from a light source, and preferably has high light transmittance, and preferably has a total light transmittance of 80% or more.

By virtue of having the above-described construction, the light diffusion sheet 20 is advantageous not only in that glare due to non-diffuse reflection or transmission may be prevented, but also in that the diffusion performance (diffusion angle) may be easily controlled.

When the substrate 11 or substrate 21 is a reflective sheet having a reflective layer, the resultant screen is a reflective screen which reflects projection light from a front projector to achieve image display. On the other hand, when the substrate 11 or substrate 21 is a transparent optical sheet, the resultant screen is a transmissive screen which transmits projection light from a rear projector to achieve image display. They will be described in detailed later.

Figure 4:
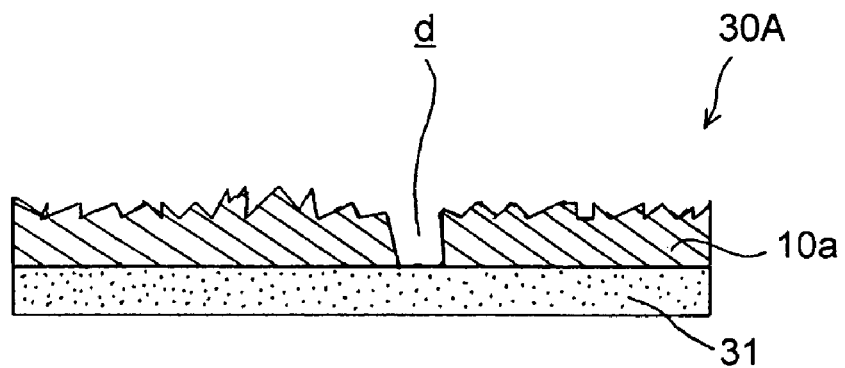
FIG. 4 is a cross-sectional view showing an example of the construction of a light diffusion sheet according to the third embodiment of the present invention.

The construction of a light diffusion sheet according to the third embodiment of the present invention is shown in FIG. 4.

As shown in FIG. 4, a light diffusion sheet 30A includes a base material 31 having a function to transmit light and diffuse the transmitted light, and a light diffusion layer 10*a*, formed on the base material 31, having an uneven surface. As the light diffusion layer, the light diffusion layer 10*a* or 10*b* shown in the first embodiment may be used.

The base material 31 is a flat polymer film having an ability to transmit light and diffuse the transmitted light, and preferably has a haze of 30% or more and a total light transmittance of 80% or more. As the base material 31, a material having asymmetric diffusion properties is preferred to a screen. The diffusion properties may be achieved from, for example, a base polymer having dispersed therein glass fiber having orientation, or a ribbed structure formed by orienting a material incompatible with the main component of the base material 31 and the like mixed into raw materials for the base material during the shaping of the base material. The incompatible material may have no ductility.

In the light diffusion sheet 30, the light diffusion layer 10*a* is one layer, and, even when the light diffusion layer 10*a* has a defect site d in the uneven surface, the base material 31 having a diffusing function offers an effect of suppressing glare due to non-diffuse reflection or transmission.

Figure 5:
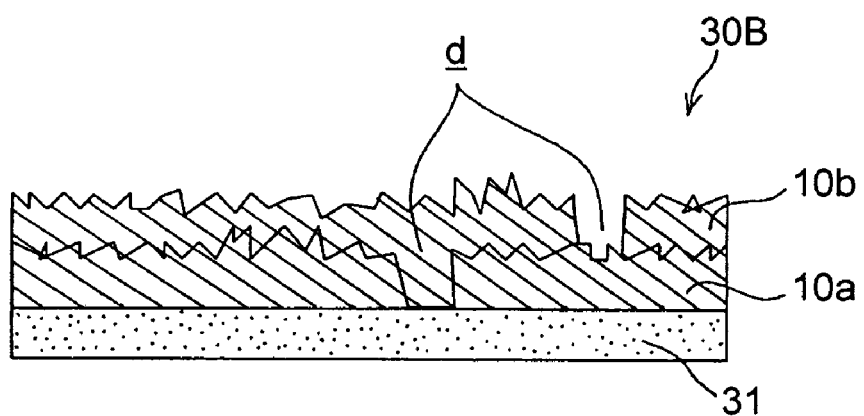
FIG. 5 is a cross-sectional view showing another example of the construction of the light diffusion sheet according to the third embodiment of the present invention.
Figure 6:
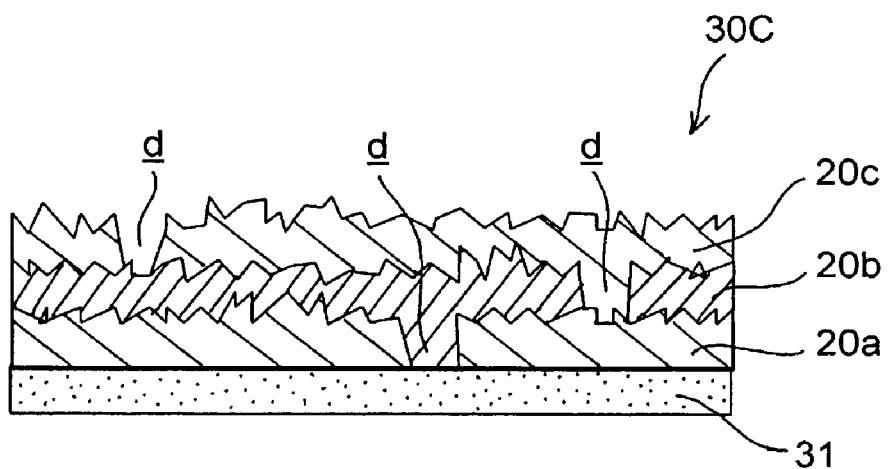
FIG. 6 is a cross-sectional view showing still another example of the construction of the light diffusion sheet according to the third embodiment of the present invention.

Variations of the construction of the light diffusion sheet according to the third embodiment of the present invention are shown in FIGS. 5 and 6.

A light diffusion sheet 30B shown in FIG. 5 includes the base material 31, and light diffusion layers 10*a*, 10*b* stacked on the base material 31. These light diffusion layers have the same constructions as those of the light diffusion layers 10a, 10b shown in the first embodiment. The effect of suppressing glare obtained by the diffusing ability of the base material 31 and the effect of making up for the defect site in the uneven surface obtained by stacking the light diffusion layers 10a, 10b further suppress the glare.

A light diffusion sheet 30C shown in FIG. 6 includes the base material 31, and light diffusion layers 20a, 20b, 20c stacked on the base material 31. These light diffusion layers have the same constructions as those of the light diffusion layers 20a, 20b, 20c shown in the second embodiment. The effect of suppressing glare obtained by the diffusing ability of the base material 31 and the effect of making up for the defect site in the uneven surface obtained by stacking the light diffusion layers 20a, 20b, 20c further suppress the glare. The diffusion angle may be controlled by appropriately stacking the light diffusion layers 20a, 20b, 20c on one another.

Next, the method of producing a light diffusion sheet of the present invention is described.

The method of producing a light diffusion sheet of the present invention includes a step of, using a mold for use in duplicating light diffusion layers, which mold has a finely engraved surface having a predetermined uneven form, transferring the uneven form of the surface of the mold to form a light diffusion layer having an uneven surface, wherein the step is repeated twice or more to stack two layers or more of the light diffusion layers on a substrate, thus obtaining a light diffusion sheet 10, light diffusion sheet 20, or light diffusion sheet 30B or 30C.

Any method may be applied to the present invention as long as the method is such that a light diffusion layer is produced using the finely engraved surface of the mold.

For example, a light diffusion layer may be formed by profiling a thermoforming plastic film by pressing the mold.

Alternatively, a desired light diffusion layer may be obtained by applying an ultraviolet curing resin to the mold and curing it and removing the cured resin from the mold.

Taking as an example the case where an ultraviolet curing resin is used as a material for optical film constituting the light diffusion layer, the preparation procedure for the light diffusion sheet 20 shown in FIG. 3 is described below.

(S11) A material (1) for optical film is applied to the finely engraved surface of a mold for use in duplicating light diffusion layers having a finely engraved surface having a predetermined uneven form. The four sides of the mold are not sealed so that bubbles in the coating film as well as the material for optical film are removed.

(S12) A transparent substrate 21 in a sheet form is placed on the coating film of the material (1) for optical film on the mold. In this instance, the substrate 21 is pressed by means of a roller or the like so that the thickness of the film becomes uniform while removing the excess material (1) for optical film.

(S13) The material (1) for optical film is cured by irradiation with ultraviolet light from the side of the substrate 21 to form a light diffusion layer 20a.

(S14) The mold is removed from the light diffusion layer 20a to obtain a light diffusion layer 20a/substrate 21 laminate.

(S15) A material (2) for optical film is applied to the finely engraved surface of the same mold in the step S11.

(S16) The light diffusion layer 20a/substrate 21 laminate obtained in the step S14 is placed on the coating film of the material (2) for optical film on the mold so that the light diffusion layer 20a faces the coating film.

(S17) The material (2) for optical film is cured by irradiation with ultraviolet light from the side of the substrate 21 to form a light diffusion layer 20b.

(S18) The mold is removed from the light diffusion layer 20b to obtain a light diffusion layer 20b/light diffusion layer 20a/substrate 21 laminate.

(S19) The material (1) for optical film is applied to the finely engraved surface of the same mold in the step S11.

(S1a) The light diffusion layer 20b/light diffusion layer 20a/substrate 21 laminate obtained in the step S18 is placed on the coating film of the material (1) for optical film on the mold so that the light diffusion layer 20b faces the coating film.

(S1b) The material (1) for optical film is cured by irradiation with ultraviolet light from the side of the substrate 21 to form a light diffusion layer 20c.

(S1c) The mold is removed from the light diffusion layer 20c to obtain a light diffusion layer 20c/light diffusion layer 20b/light diffusion layer 20a/substrate 21 laminate, thus forming a light diffusion sheet 20 of a three-layer structure including the light diffusion layers 20a, 20b, 20c.

The materials (1) and (2) for optical film may be either the same material for optical film or such that one of them is a material for high refractive-index optical film and another is a material for low refractive-index optical film. These materials may be appropriately selected from the above-mentioned materials for optical film.

For increasing the number of the light diffusion layers stacked, a cycle of the steps S15 to S18 or steps S15 to S1c may be repeated necessary times.

For controlling the diffusion angle of the light diffusion sheet 20, the number of the light diffusion layers stacked and/or the difference in refractive index between the adjacent light diffusion layers may be appropriately selected. In this case, it is preferred that the relationship between the number of the light diffusion layers stacked, the difference in refractive index between the adjacent light diffusion layers, and the diffusion angle is experimentally determined preliminarily and the required number of the light diffusion layers stacked and/or difference in refractive index between the adjacent light diffusion layers is selected depending on the use.

When the light diffusion sheet 30C shown in FIG. 6 is produced, the base material 31 is used instead of the substrate 21.

The mold for use in duplicating light diffusion layers used in the method may be produced by the method using sandblasting described below.

Figure 7A:
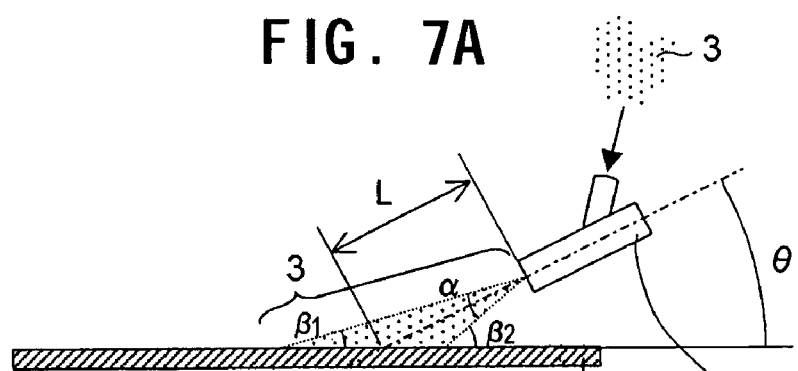
FIGS. 7A and 7B are diagrammatic views illustrating sandblasting for a mold base material in the process for producing a mold for use in duplicating light diffusion layers used in the present invention.
Figure 7B:
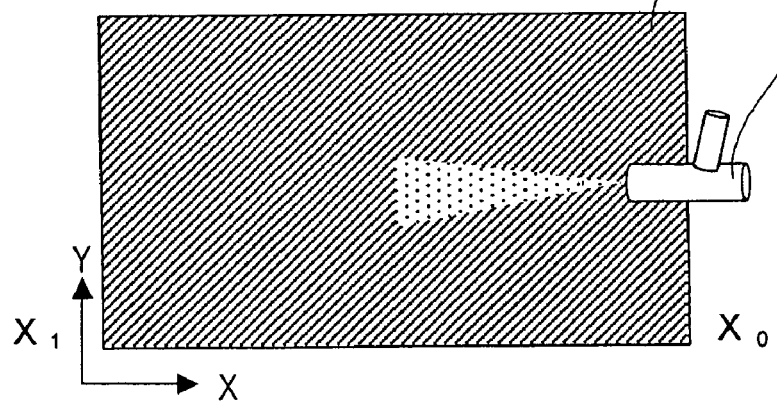

FIG. 7 illustrates production of a mold for use in duplicating light diffusion sheets, in which the surface of a mold base material 1 is processed by sandblasting to produce a mold for duplicating light diffusion layers. The form of the mold base material is not limited to the flat plate, but may be a form suitable for continuously forming a film, such as a roll form or a conveyer form.

Sandblasting is processing in which grit 3 is blasted from a blast gun 2 of a sandblaster (not shown) using pressurized air to the surface of the mold base material 1 so that the grit 3 collides with the surface of the mold base material 1 to form an uneven surface in the mold base material 1.

As the grit 3, polygonal ceramic particles having a particle size of 5 to 50 μm are used, but the grit is not limited to this, and preferred are spherical or angular, e.g., polygonal particles having an average particle size of 1 to 1,000 μm, which include a resin, glass, a metal, ceramic, or the like. Examples include glass beads, zirconia particles, steel grit, alumina particles, and silica particles.

The mold base material 1 is a sheet including a material suitable for sandblasting. This material may be a resin, ceramic (e.g., an oxide or a nitride), or a metal. Examples include aluminum, copper, and steel, and especially preferred is aluminum. In the batch production, the mold base material 1 may have such a size that one sheet of the mold base material is sufficient to form a light diffusion sheet used in one screen, and, in the continuous production, the mold base material 1 may have a size sufficient for the width of the light diffusion sheet.

The blast angle (angle of depression) of the grit 3 to the principal surface of the mold base material 1 may be less than 90°, and, in the present invention, by blasting the grit at an angle of 10°, the pitches of grooves in the blast direction and in the direction perpendicular to the blast direction may be changed. The grit 3 collides at an angle with the mold base material 1, and therefore a difference is caused in the form of deformation due to the collision between the lateral direction (X-axis direction) and the longitudinal direction (Y-axis direction). The parameters of the surface roughness including the pitch may be controlled by changing the sandblasting conditions, and, when grit having a large particle size is used, there may be achieved surface roughness having large pitches in both the X- and Y-axis directions, and, when grit having a larger density is used, deep grooves may be realized.

By using the mold for duplicating light diffusion layers produced under the above-mentioned blasting conditions, there may be produced a light diffusion layer having diffusion angles such that the diffusion angle in the longitudinal direction is different from the diffusion angle in the lateral direction, or having anisotropy in the diffusion properties in the longitudinal and lateral directions. For example, under the blasting conditions of the grit 3 in FIG. 7, the diffusion angle of the reflected light or transmitted light in the X-direction is smaller, and the diffusion angle in the Y-direction is larger.

As the angle between the blast gun 2 and the mold base material 1 is reduced, that is, the angle θ is smaller, the below-mentioned aspect ratio of the diffusion angle of the light diffusion sheet may be increased, and hence the effect of the anisotropy in the diffusion properties is more remarkable.

The grit 3 is blasted from the blast gun 2 to the mold base material 1 at the angle θ with an angle width α. In other words, the grit 3 collides with the mold base material at an angle within the range of angles $\beta_1$ to $\beta_2$. The angle width α is generally about 10°.

When a smaller region of the mold base material 1 is processed, the angle width α may be reduced, or a distance L between the blast gun 2 and the mold base material 1 may be reduced. When a larger region of the mold base material 1 is processed, the sandblasting may be conducted while smoothly moving the blast gun 2 or the mold base material 1, and, in the present invention, by scanning the blast gun 2 in the longitudinal and lateral directions over the mold base material 1 while blasting the grit, the entire principal surface of the mold base material 1 is sandblasted.

Figure 8:
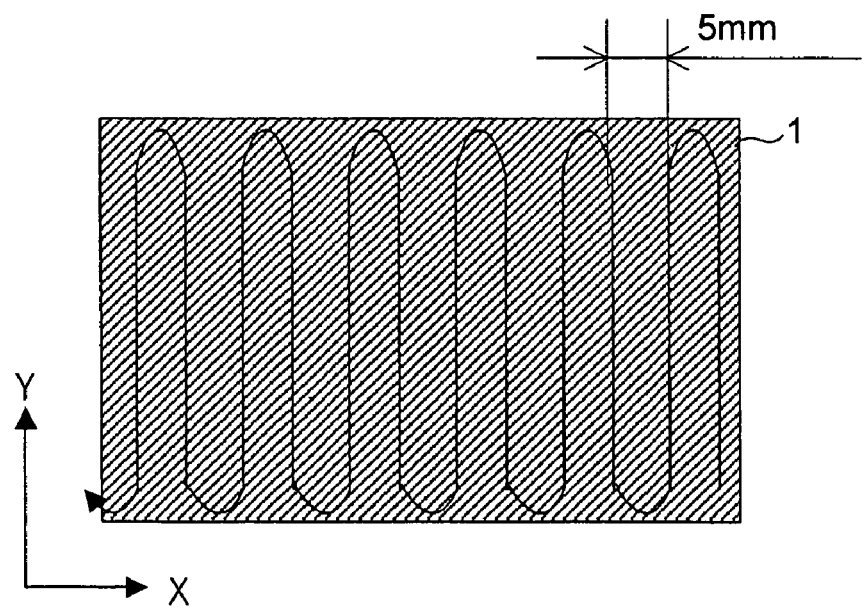
FIG. 8 is a diagrammatic view showing scanning of a blast gun in the process for producing a mold for use in duplicating light diffusion layers used in the present invention.

An example of scanning of the blast gun 2 is shown in FIG. 8. The blast gun 2 is moved over the mold base material 1 in one direction of the Y-axis at a constant rate while blasting the grit 3 from the blast gun 2, and, at a time when the region of collision of the grit 3 reaches the almost end of the mold base material 1, the blast gun 2 is moved in the X-axis direction at a certain pitch, and then moved in the opposite direction of the Y-axis at a constant rate. Subsequently, each time when the region of collision of the grit 3 reaches the almost end of the mold base material 1, the blast gun 2 is moved in the X-axis direction at a certain pitch, and then the movement in the Y-axis direction is reversed and the sandblasting is continued, thus forming a desired uneven surface in the entire mold base material 1.

It is preferred that the pitch of the movement in the X-axis direction is adjusted so that the adjacent regions of collision of the grit 3 overlap to a certain extent and the mold base material 1 has a collectively uneven surface. Alternatively, the region of collision of the grit 3 may be covered with a mask so that the grit 3 collides with the mold base material 1 only at the middle region of the collision region.

The scanning method may be either a method in which the mold base material 1 is fixed and the blast gun 2 is moved, or a method in which a stage on which the mold base material 1 is placed is moved in the X-axis direction and the blast gun 2 is moved in the Y-axis direction.

A finely engraved surface having an uneven form is formed by the sandblasting in the surface of the mold base material 1. This uneven form is used as a master-pattern for the surface form of the light diffusion layer which is the final product, and the light diffusion layer may be formed using the finely engraved surface.

In the present invention, any method may be applied to the present invention as long as the method forms a light diffusion layer using the finely engraved surface. For example, a method may be used in which, using a substrate having formed a finely engraved surface, an electroformed mold having transferred the finely engraved surface is produced, and then a light diffusion layer is directly or indirectly formed using the electroformed mold.

The production process using sandblasting for a mold for use in duplicating light diffusion layers is described above as an example, but the process is not limited to this, and any process may be employed as long as the process may form a finely uneven surface, for example, there may be mentioned a method in which a speckle pattern, which is caused when a roughened surface is irradiated with a coherent light flux, is formed in a photosensitive resin to form a mold, a method in which a mask is prepared and baked on a photosensitive resin, and a method in which the surface of a mold base material, such as a metal or a resin, is directly ground by mechanical processing to form a finely uneven surface.

Next, a structure of a screen according to an embodiment of the present invention is described.

Figure 9:
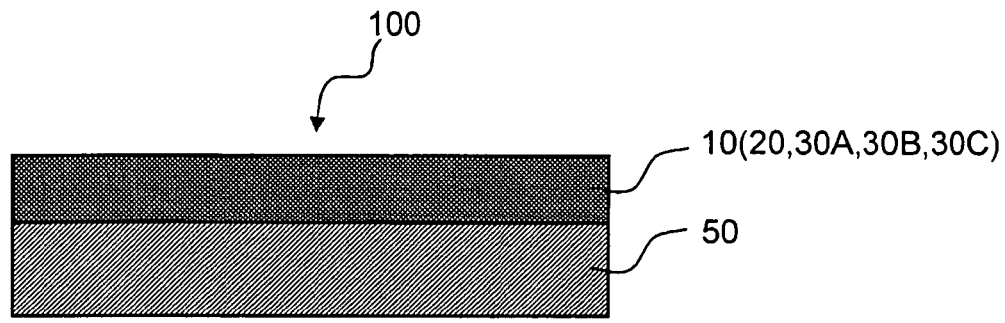
FIG. 9 is a cross-sectional view showing the construction of a screen according to the first embodiment of the present invention.

A cross-sectional view showing the construction of a screen according to the first embodiment of the present invention is shown in FIG. 9.

A screen 100 is a reflective screen which includes a reflective sheet 50, and any one of the light diffusion sheets 10, 20, 30A, 30B, 30C. The light diffusion sheet 10 or 20 may be either directly formed on the reflective sheet 50 or attached to the reflective sheet 50. The light diffusion sheet 30A, 30B, or 30C is attached to the reflective sheet 50.

The reflective sheet 50 has reflecting properties with respect to individual light in a plurality of specific wavelength regions corresponding to the projection light as image light, and has absorbing properties with respect to visible light in wavelength regions other than the specific wavelength regions. The specific wavelength regions preferably include the wavelength regions of light of RGB three primary colors used as image light in a projection light source.

Figure 10:
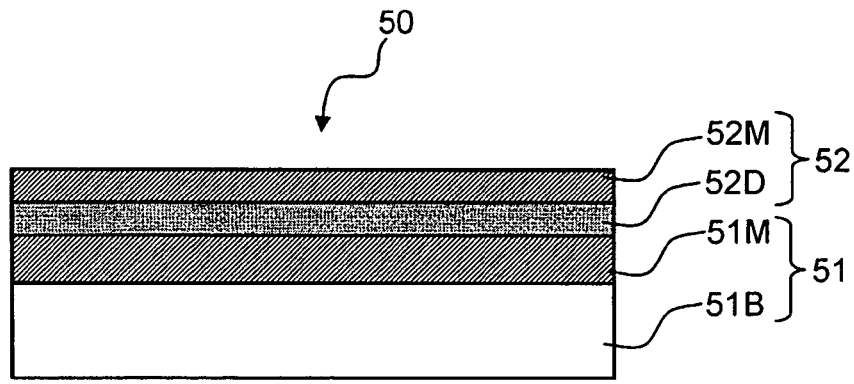
FIG. 10 is a cross-sectional view showing an example of the construction of optical films in a reflective sheet 50.

FIG. 10 shows an example of the construction of the reflective sheet 50 including an optical multilayer film 52, which includes a dielectric film 52D and a light-absorbing thin film 52M having transmitting properties, and a reflective layer 51.

The reflective layer 51 includes a metal film 51M formed on a substrate 51B, and reflects light which has passed through the optical multilayer film 52.

The substrate 51B is a substrate for the reflective sheet 50, and examples include polymers having flexibility, such as polycarbonate (PC), polyethylene terephthalate (PET), polyethylene naphthalate (PEN), polyether sulfone (PES), and polyolefin (PO).

The metal film 51M may include any metallic material being capable of reflecting visible light at a high reflectance. For example, the metal film 51M preferably includes Al, Au, or Ag and preferably has a thickness of 50 nm or more. The metal film 51M may be formed on the substrate 51B by any method, such as vapor deposition, sputtering, plating, or coating.

Instead of the reflective layer 51 including the metal film 51M formed on the substrate 51B shown in FIG. 10, a metallic substrate including the same material as the metal film 51M may be used.

The optical multilayer film 52 is a film having selectively reflecting properties and including at least two layers, i.e., the dielectric film 52D and the light-absorbing thin film 52M having transmitting properties. In this case, the optical multilayer film may have either a structure obtained by alternately stacking the dielectric film 52D and the light-absorbing thin film 52M having transmitting properties, or a structure obtained by stacking a plurality of dielectric films 52D on one another.

The dielectric film 52D includes a material which is transparent at least in the wavelength regions of visible light, and, for example, $Nb_2O_5$, $TiO_2$, $Ta_2O_5$, $Al_2O_3$, or $SiO_2$ is used. The larger the refractive index of the dielectric film 52D, the larger the half band width of the reflection peak in the individual wavelength regions of light of three primary colors, or, the smaller the refractive index, the smaller the half band width, and therefore a dielectric material may be appropriately selected depending on the selectively reflecting properties required.

The light-absorbing thin film 52M having transmitting properties is a thin film preferably having a thickness of 5 to 20 nm and being formed from a material having a refractive index of 1 or more and an absorption coefficient of 0.5 or more. Examples of such materials include Nb, Nb alloys, C, Cr, Fe, Ge, Ni, Pd, Pt, Rh, Ti, TiN, $TiN_xW_y$, Mn, Ru, and PbTe. Each film in the optical multilayer film 52 may be formed by a dry process, such as a sputtering process.

The thickness of each film in the optical multilayer film 52 is designed so that the optical multilayer film has high reflecting properties with respect to light in the wavelength regions of three primary colors, i.e., red, green, and blue such that the reflectance is, e.g., 50% or more and high absorbing properties with respect to light in wavelength regions other than the wavelength regions of three primary colors such that the absorption is, e.g., 80% or more. When the thickness of each film in the optical multilayer film 52 is taken as "d", the refractive index of the film is taken as "n", and the wavelength of incident light to the optical multilayer film is taken as "λ", the thickness of the film is preferably designed so that, with respect to the wavelength λ of the incident light, an optical thickness nd of the film satisfies the following formula (1):

$$nd=\lambda(\alpha\pm1/4) \quad (1)$$

wherein α is a natural number.

For example, when the metal film 51M includes an Al film (thickness: 50 nm) and the optical multilayer film 52 has a three-layer structure including $Nb_2O_5$/Nb/$Nb_2O_5$ {each thickness: 560 nm/19 nm/550 nm (Al film side)}, the resultant reflective sheet 50 may have a reflectance as high as 50% or more with respect to light in the wavelength regions of three primary colors in the projection light (light from a projection light source using the laser generator) and has an absorption as high as 80% or more with respect to light (stray light) in the wavelength regions outside of the wavelength regions of three primary colors.

Figure 11:
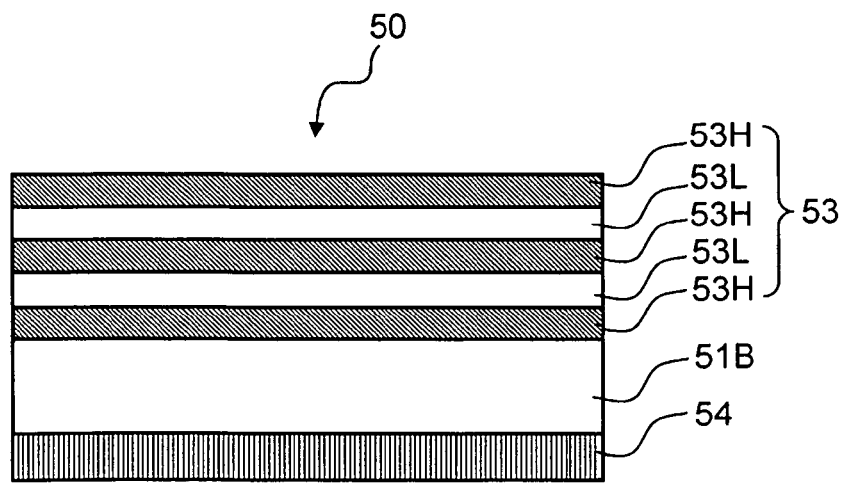
FIG. 11 is a cross-sectional view showing another example of the construction of optical films in the reflective sheet 50.

FIG. 11 shows another example of the construction of the reflective sheet 50 including, on a substrate 51B, an optical multilayer film 53 having reflecting properties with respect to individual light in the wavelength regions of RGB three primary colors among the wavelength regions of projection light and having transmitting properties with respect to light in wavelength regions other than the wavelength regions of three primary colors, and a light absorbing layer 54 on the back side of the substrate 51B. The substrate 51B may be the same substrate as that shown in FIG. 10.

The optical multilayer film 53 is a film having selectively reflecting properties, which is obtained by alternately stacking a high refractive-index film 53H and a low refractive-index film 53L having a refractive index lower than that of the high refractive-index film 53H.

Each of the high refractive-index film 53H and the low refractive-index film 53L may be formed by either a dry process, such as a sputtering process, or a wet process, such as spin coating or dip coating.

When forming the film by a dry process, as a constituent material for the high refractive-index film 53H, various materials having a refractive index of about 2.0 to 2.6 may be used. Similarly, as a constituent material for the low refractive-index film 53L, various materials having a refractive index of about 1.3 to 1.5 may be used. For example, the high refractive-index film 53H may include $TiO_2$, $Nb_2O_5$, or $Ta_2O_5$, and the low refractive-index film 53L may include $SiO_2$ or $MgF_2$.

When forming the film by a dry process, the thickness of each film in the optical multilayer film 53 may be designed by the simulation according to a matrix method so that the resultant optical thin film has high reflecting properties with respect to light in specific wavelength regions and high transmitting properties with respect to at least visible light in wavelength regions other than the specific wavelength regions. The simulation according to a matrix method is a method described in Unexamined Japanese Patent Application Publication No. 2003-270725, in which the thickness of an optical film is designed so that the optical film has desired properties by making a simulation utilizing the equation based on the principle in which, when light is applied at an angle $\theta_0$ to a multilayer optical thin film including layers having a plurality of different materials such that multi-reflection occurs at the individual borders between the layers, the phases are aligned depending on the type and wavelength of the light source used and the optical film thickness (product of a refractive index and a geometric thickness) of each layer and the velocities of the reflected light have coherence and interfere with one another.

In the present invention, selecting the wavelength regions of individual light of RGB three primary colors used as image light in a projection light source as the specific wavelength regions, the thickness may be designed by the simulation according to a matrix method so that the optical thin film reflects only light in the wavelength regions of three primary colors and transmits light in wavelength regions other than the wavelength regions of three primary colors. By stacking on one another the high refractive-index film 53H and the low refractive-index film 53L each having the thus designed thickness, the optical multilayer film 53 which advantageously serves as a filter for the wave range of three primary colors may be surely achieved.

With respect to the number of the optical films constituting the optical multilayer film 53 formed by a dry process, there is no particular limitation, and the optical multilayer film may include a desired number of optical films, but it is preferred that the optical multilayer film includes an odd number of layers so that the high refractive-index film 53H constitutes the respective outermost layers on the incident light side and on the other side.

When the optical multilayer film 53 is formed by a wet process, the optical multilayer film may include an odd number of layers and formed by alternately stacking on one another the high refractive-index film 53H, which is obtained by applying a solvent composition for high refractive-index film and curing it, and the low refractive-index film 53L having a refractive index lower than that of the high refractive-index film 53H, which is obtained by applying a solvent composition for low refractive-index film and curing it. Each optical film may be formed by applying a composition containing a resin which absorbs energy to undergo a curing reaction due to heating or irradiation with ultraviolet light. For example, the high refractive-index film 53H may be formed from a thermosetting resin Opstar, manufactured and sold by JSR Corporation (JN7102; refractive index: 1.68), and the low refractive-index film 53L may be formed from a thermosetting resin Opstar, manufactured and sold by JSR Corporation (JN7215; refractive index: 1.41). Thus, the resultant optical multilayer film 53 has flexibility.

The high refractive-index film 53H is not limited to the above-mentioned thermosetting resin, but a solvent composition which achieves a refractive index of about 1.6 to 2.1, for example, the material for high refractive-index optical film mentioned above in connection with the light diffusion sheet may be used. The low refractive-index film 53L is not limited to the above-mentioned thermosetting resin, but a solvent composition which achieves a refractive index of about 1.3 to 1.59, for example, the material for low refractive-index optical film mentioned above in connection with the light diffusion sheet may be used. The larger the difference in refractive index between the high refractive-index film 53H and the low refractive-index film 53L, the smaller the number of the stacked layers needed.

When forming the film by a wet process, the thickness of each film in the optical multilayer film 53 is designed so that the optical multilayer film has high reflecting properties with respect to light in the wavelength regions of three primary colors, i.e., red, green, and blue such that the reflectance is, e.g., 50% or more, and has high transmitting properties with respect to light in wavelength regions other than the wavelength regions of three primary colors such that the transmittance is, e.g., 80% or more. The thickness of each film in the optical multilayer film 53 may be designed so as to satisfy the formula (1) above.

For example, when the optical multilayer film 53 has a 19-layer structure obtained by alternately stacking nine layers of the high refractive-index films 53H (refractive index: 1.68) each having a thickness of 1,023 nm and nine layers of the low refractive-index films 53L (refractive index: 1.41) each having a thickness of 780 nm, and stacking the high refractive-index film 53H on the stacked layers, the resultant film has a reflectance as high as 80% or more with respect to light in the wavelength regions of three primary colors in the projection light (light from a projection light source using the laser generator) and has high transmitting properties such that the reflectance is 20% or less with respect to light (stray light) in the wavelength regions outside of the wavelength regions of three primary colors.

The absorbing layer 54 includes a black coating film formed by applying a black composition to the back surface of the substrate 51B, or a black film attached to the back surface of the substrate, and has an ability to absorb light. The absorbing layer 54 absorbs light which has passed through the optical multilayer film 53 to prevent the transmitted light from undergoing reflection, so that the reflective sheet 50 may more surely obtain only light in the wavelength regions of three primary colors as the reflected light. A black composition or the like may be contained into the substrate 51B so that the substrate 51B is colored with black and functions as an absorbing layer.

The reflective sheet 50 having any of the above-described constructions may reflect at a high reflectance light in specific wavelength regions (wavelength regions of three primary colors) corresponding to the projection light from a projection light source, and absorb light (ambient light) in wavelength regions other than the specific wavelength regions.

The screen 100 has the reflective sheet 50 and hence reflects light in wavelength regions of three primary colors, so that a viewer sees a reflected image of the image displayed on the screen, namely, only the reflected light of the image displayed on the reflective screen. However, when the reflected light from the screen only includes a specular reflection component, the viewer is faced with an issue in that an excellent image is difficult to see and the visual field is limited, making it impossible to see a natural image.

For solving the shortcomings, by providing any one of the light diffusion sheets 10, 20, 30A, 30B, 30C with the screen 100, the viewer is able to see the scattered reflected light from the screen 100. In other words, by providing any one of the light diffusion sheets 10, 20, 30A, 30B, 30C on the reflective sheet 50, light in specific wavelength regions among the light which has passed through the light diffusion sheet is selectively reflected by the reflective sheet 50, and the reflected light is diffused upon passing through the light diffusion sheet, so that the scattered reflected light other than the specular reflection component may be obtained. Consequently, the reflected light from the reflective screen 100 includes the specular reflection component and the scattered reflected light, and hence the viewer is able to see the scattered reflected light in addition to the specular reflection component, thus considerably improving the viewing angle properties. Thus, the viewer is able to see a natural image.

In the screen 100, the light diffusion sheet 10, 20, 30A, 30B, or 30C of the present invention is used as a light diffusion sheet, and therefore the defect site in the uneven surface of the light diffusion sheet is suppressed, so that a normal reflected image free from non-diffuse reflection may be seen on the screen. Further, when image light is projected and observed near the front of the screen, an image with uniform and high luminance may be seen at a specific position, confirming that the reflected image light may be controlled to direct a specific visual field.

With respect to the reflective screen, the required viewing angle or luminance varies depending on the size or brightness of lighting of a room in which the screen is placed, but, by employing the present invention which may offer inexpensive and various light diffusion sheets free of defects, the requirements may be met.

The reflective sheet 50 having a reflective layer of a wavelength selecting type is shown, but the reflective layer is not limited to this, and the reflective layer may be one using a material having a high reflectance in a wide range of wavelengths of visible light, e.g., aluminum or silver, and any reflective layer may be used as long as it may reflect the image light.

Figure 12:
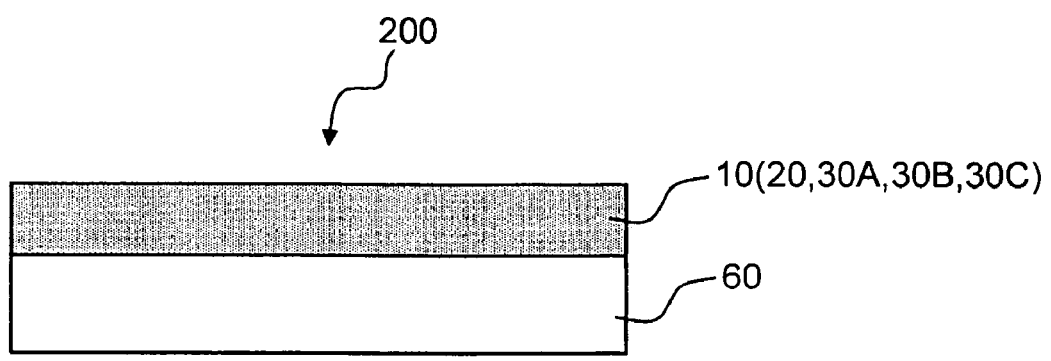
FIG. 12 is a cross-sectional view showing the construction of a screen according to the second embodiment of the present invention.

Next, a cross-sectional view of the construction of a screen according to the second embodiment of the present invention is shown in FIG. 12.

As shown in FIG. 12, a screen 200 is a transmissive screen including any one of the light diffusion sheets 10, 20, 30A, 30B, 30C on a substrate 60.

The substrate 60 is a substrate for the screen 200, and may include a polymer, such as polyethylene terephthalate (PET), polyethylene naphthalate (PEN), polyether sulfone (PES), or polyolefin (PO).

The screen 200 receives projection light from the side of the substrate 60 opposite the surface on which any one of the light diffusion sheets 10, 20, 30A, 30B, 30C is formed, and permits the light to pass through the substrate 60 and to be scattered from the light diffusion sheet. A viewer is able to see a natural image by observing the scattered reflected light.

In the screen 200, the light diffusion sheet 10, 20, 30A, 30B, or 30C of the present invention is used as a light diffusion sheet, and therefore the defect site in the uneven surface of the light diffusion sheet is suppressed, so that a normal transmitted image free from non-diffuse reflection may be seen on the screen.

With respect to the transmissive screen, like the reflective screen, the required viewing angle or luminance varies depending on the environment in which the screen is placed, and therefore, by employing the present invention which may easily form light diffusion sheets having various diffusing power, the requirements may be met.

In each of the screens 100, 200, the diffusion properties are preferably controlled by adjusting the surface form of the light diffusion sheet 10, 20, 30A, 30B, or 30C per position of the screen so that the collective luminance distribution observed by a viewer becomes uniform over the screen. For achieving this, for example, the axis-shift in the luminance peak is preferably directed to the middle portion of the screen. Specifically, with respect to the collective diffusion properties on the entire screen, the diffusion properties on the whole periphery portion of the screen preferably have a feature such that a luminance peak of the transmitted light is at an angle in the direction of the middle portion of the screen and the angle is continuously increased in the direction of from the middle portion to the periphery portion of the screen.

The application of the light diffusion sheet of the present invention is not limited to the above-mentioned projection type display device, but the light diffusion sheet may be applied to various fields, such as display devices and lighting apparatuses, which need to control the viewing angle.

EXAMPLES

The present invention will be described with reference to the following Examples. The following Examples are merely examples, and the present invention is not limited to the following Examples.

Example 1

A light diffusion sheet was prepared under the following conditions.

(1) Mold for use in duplicating light diffusion layers:
Mold base material: Aluminum sheet {for size of horizontal (Y): 2,400 mm×vertical (X): 1,800 mm}

The mold base material was subjected to the above-mentioned sandblasting so that the material had a finely engraved surface (uneven surface). In this instance, the sandblasting was conducted so that a difference in the uneven form of the surface was caused between the vertical direction and the horizontal direction (the X-axis direction and the Y-axis direction) and the form of deformation (recess) in the X-axis direction was longer than that in the Y-axis direction.

(2) Substrate: Polyethylene terephthalate (PET) film having a thickness of 100 μm (3) Constituent material A for light diffusion layer: Ultraviolet curing acrylic resin (refractive index: 1.53)

Preparation Procedure for Light Diffusion Sheet (S21) The constituent material A was applied to the finely engraved surface of the mold for use in duplicating light diffusion layers.

(S22) The PET film was placed on the coating film of the constituent material A on the mold, and pressed by means of a roller so that the thickness of the resin became uniform while removing the excess resin.

(S23) The constituent material A was cured by irradiation with ultraviolet light from the side of the PET film at an integral quantity of light of 1,000 mJ, which is sufficient to polymerize and cure the resin, to form a light diffusion layer as the first layer.

(S24) The mold was removed from the light diffusion layer as the first layer to obtain a light diffusion layer (first layer)/PET film laminate.

(S25) The constituent material A was applied to the finely engraved surface of the same mold in the step S21.

(S26) The light diffusion layer (first layer)/PET film laminate was placed on the coating film of the constituent material A on the mold so that the light diffusion layer (first layer) faced the coating film, and pressed by means of a roller so that the thickness of the resin became uniform while removing the excess resin.

(S27) The constituent material A was cured by irradiation with ultraviolet light from the side of the PET film at an integral quantity of light of 1,000 mJ, which is sufficient to polymerize and cure the resin, to form a light diffusion layer as the second layer.

(S28) The mold was removed from the light diffusion layer as the second layer to obtain a light diffusion layers (second layer/first layer)/PET film laminate.

Subsequently, a reflective sheet including aluminum was attached to the surface of the PET film (back surface) of the laminate obtained in the step S28, which surface is opposite the surface of the PET film on which the light diffusion layers are formed, to form a screen for evaluation.

Example 2

A screen for evaluation was formed under substantially the same conditions as those in Example 1 except that a constituent material B which is a fluorine ultraviolet curing acrylic resin (refractive index: 1.38) was used in the light diffusion layer as the second layer.

Example 3

A screen for evaluation was formed under substantially the same conditions as those in Example 1 except that the constituent material B was used in the light diffusion layer as the first layer.

Example 4

A screen for evaluation was formed under substantially the same conditions as those in Example 1 except that a light diffusion sheet of a three-layer structure was prepared according to the following procedure.

Preparation Procedure for Light Diffusion Sheet (S31) The constituent material A was applied to the finely engraved surface of the mold for use in duplicating light diffusion layers.

(S32) The PET film was placed on the coating film of the constituent material A on the mold, and pressed by means of a roller so that the thickness of the resin became uniform while removing the excess resin.

(S33) The constituent material A was cured by irradiation with ultraviolet light from the side of the PET film at an integral quantity of light of 1,000 mJ, which is sufficient to polymerize and cure the resin, to form a light diffusion layer as the first layer.

(S34) The mold was removed from the light diffusion layer as the first layer to obtain a light diffusion layer (first layer)/PET film laminate.

(S35) The constituent material B was applied to the finely engraved surface of the same mold in the step S31.

(S36) The light diffusion layer (first layer)/PET film laminate was placed on the coating film of the constituent material B on the mold so that the light diffusion layer (first layer) faced the coating film, and pressed by means of a roller so that the thickness of the resin became uniform while removing the excess resin.

(S37) The constituent material B was cured by irradiation with ultraviolet light from the side of the PET film at an integral quantity of light of 1,000 mJ, which is sufficient to polymerize and cure the resin, to form a light diffusion layer as the second layer.

(S38) The mold was removed from the light diffusion layer as the second layer to obtain a light diffusion layers (second layer/first layer)/PET film laminate.

(S39) The constituent material A was applied to the finely engraved surface of the same mold in the step S31.

(S3a) The light diffusion layers (second layer/first layer)/PET film laminate was placed on the coating film of the constituent material A on the mold so that the light diffusion layer (second layer) faced the coating film, and pressed by means of a roller so that the thickness of the resin became uniform while removing the excess resin.

(S3b) The constituent material A was cured by irradiation with ultraviolet light from the side of the PET film at an integral quantity of light of 1,000 mJ, which is sufficient to polymerize and cure the resin, to form a light diffusion layer as the third layer.

(S3c) The mold was removed from the light diffusion layer as the third layer to obtain a light diffusion layers (third layer/second layer/first layer)/PET film laminate.

Examples 5 and 6

Screens for evaluation were individually formed under substantially the same conditions as those in Example 4 except that constituent materials C and D, which are fluorine ultraviolet curing acrylic resins having refractive indexes of 1.46 and 1.49, respectively, were individually used in the light diffusion layer as the second layer.

Example 7

A screen for evaluation was formed under substantially the same conditions as those in Example 4 except that a constituent material E having the composition shown below was used in the light diffusion layers as the first layer and third layer.

Constituent material E

Fine particles: TiO$_2$ fine particles (manufactured and sold by Ishihara Sangyo Kaisha Ltd.; average particle size: about 20 nm; refractive index: 2.48)

100 Parts by weight

Dispersant: SO$_3$Na Group-containing urethane acrylate (weight average molecular weight: 500; SO$_3$Na group concentration: $2\times10^{-3}$ mol/g)

20 Parts by weight

Binder: Mixture of dipentaerythritol hexaacrylate and dipentaerythritol pentaacrylate (UV curing resin, trade name: DPHA; manufactured and sold by Nippon Kayaku Co., Ltd.)

30 Parts by weight

Organic solvent: Methyl isobutyl ketone (MIBK)

2,400 Parts by weight

First, the fine particles, dispersant, and organic solvent in respectively predetermined amounts were mixed together, and dispersed by mean of a paint shaker to obtain a TiO$_2$ fine-particle dispersion. Then, the binder was added to the dispersion and agitated by means of an agitator to prepare a constituent material E.

Example 8

The light diffusion sheet in Example 4 was further subjected to treatment under the conditions in the steps S35 to S36 to form a light diffusion layer as the fourth layer, thus preparing a light diffusion sheet of a four-layer structure, and subsequently a reflective sheet including aluminum was attached to the back surface of the PET film of the light diffusion sheet to form a screen for evaluation.

Example 9

The light diffusion sheet in Example 8 was further subjected to treatment under the conditions in the steps S39 to S3c to form a light diffusion layer as the fifth layer, thus preparing a light diffusion sheet of a five-layer structure, and subsequently a reflective sheet including aluminum was attached to the back surface of the PET film of the light diffusion sheet to form a screen for evaluation.

Example 10

A light diffusion sheet of a one-layer structure was prepared in substantially the same manner as in Example 1 except that a polyethylene terephthalate (PET) film (haze PET; haze: 90%; total light transmittance: 87.5%; diffusion angle aspect ratio: 9; thickness: 40 µm), which transmits light and diffuses the transmitted light, was used as a substrate, and that the preparation of light diffusion sheet was terminated at the step S24 in the above procedure. Subsequently, a reflective sheet including aluminum was attached to the back surface of the PET film of the light diffusion sheet to form a screen for evaluation.

Example 11

A light diffusion sheet of a two-layer structure was prepared in substantially the same manner as in Example 2 except that a polyethylene terephthalate (PET) film (haze PET; haze: 90%; total light transmittance: 87.5%; diffusion angle aspect ratio: 9; thickness: 40 µm), which transmits light and diffuses the transmitted light, was used as a substrate, and subsequently a reflective sheet including aluminum was attached to the back surface of the PET film of the light diffusion sheet to form a screen for evaluation.

Comparative Example 1

A light diffusion sheet of a one-layer structure was prepared in substantially the same manner as in Example 1 except that the preparation of light diffusion sheet was terminated at the step S24 in the above procedure, and subsequently a reflective sheet including aluminum was attached to the back surface of the PET film of the light diffusion sheet to form a screen for evaluation.

Comparative Examples 2 and 3

Screens for evaluation were individually formed under substantially the same conditions as those in Comparative Example 1 except that constituent materials F and B, which are ultraviolet curing acrylic resins having refractive indexes of 1.43 and 1.38, respectively, were individually used in the light diffusion layer as the first layer.

The screens formed for evaluation were evaluated as follows.

(1) Measurement of Diffusion Angle

The front surface of the screen was irradiated with parallel rays of light to measure a diffusion angle of the reflected light in the horizontal direction and in the vertical direction (angle at which the reflection strength is half of the peak strength of the reflected light: half band width).

(2) Defect Recognizability

The front surface of the screen was irradiated with parallel rays of light, and the screen was visually examined from the position in front of the screen to check whether or not glare due to non-diffuse reflection was caused. The recognizability was evaluated in accordance with the following criteria.

ⓞ: Glare due to non-diffuse reflection was not recognized when observed at the position of regular reflection.

○: Slight glare due to non-diffuse reflection was recognized, which caused no issue, when observed at the position of regular reflection.

x: Glare due to non-diffuse reflection was recognized when observed at the position of regular reflection.

Figure 13A:
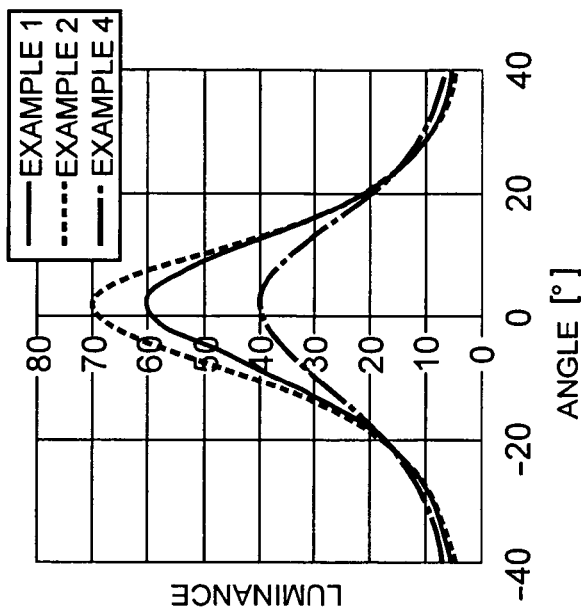
FIGS. 13A and 13B are graphs showing diffusion angles of the light diffusion sheets in Examples 1, 2, and 4.
Figure 13B:
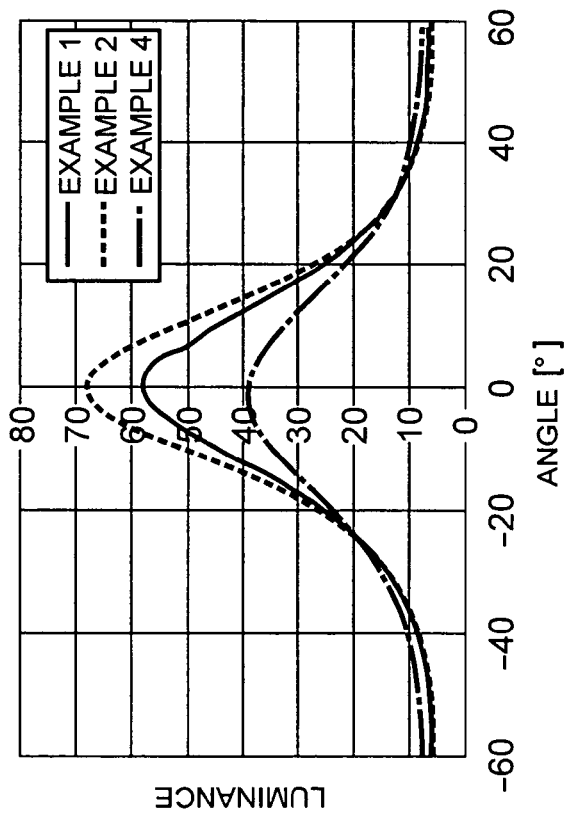

The results of the evaluation are shown in Table 1 and FIG. 13.

layer and the defect site in the second light diffusion layer did not overlap, and therefore glare due to non-diffuse reflection at the defect portion was not observed. Thus, there could be formed a light diffusion sheet which is advantageous not only in that it has a size as large as 1,800 mm×2,400 mm, but also in that no defect portion is recognized.

In Example 2, there could be obtained a laminate light diffusion sheet which is free from separation of the light diffusion layers having different refractive indexes at their interface.

The diffusion angle of the laminate diffusion sheet was measured. As can be seen from FIG. 13, the diffusion angle in Example 2 is small, as compared to that in Example 1, but both the gain and the contrast are improved. The reason for this is that the layer in contact with air having a refractive index of about 1.00 has a low refractive index, making it possible to suppress the surface reflection.

In Examples 3 to 9, by increasing the number of the stacked layers or changing the refractive index of the light diffusion layer, a variety of diffusion angles and gains could be achieved. The reason for this is that the difference in refractive index between the adjacent light diffusion layers causes light to be diffused at the individual interfaces between the light diffusion layers. In addition, the light diffusion sheet includes the stacked light diffusion layers, and hence, in each Example, an excellent light diffusion sheet having a large size and being free from non-diffuse reflection due to the defect could be formed.

In the light diffusion sheet of a one-layer structure in Example 10, glare due to non-diffuse reflection at the defect portion was suppressed. In the light diffusion sheet of a stacked structure in Example 11, not only was glare further suppressed, but also the diffusion angle and the gain could be adjusted.

By contrast, in the light diffusion sheets of a one-layer structure in Comparative Examples 1 to 3, there was a defect

TABLE 1

| | Substrate | Number of stacked layers | Refractive index | | | | | Difference in refractive index between adjacent layers | Diffusion angle (°) | | Gain | Defect recognizability |
| | | | 1st layer | 2nd layer | 3rd layer | 4th layer | 5th layer | | Horizontal direction | Vertical direction | | |
|---|---|---|---|---|---|---|---|---|---|---|---|---|
| Example 1 | PET | 2 | 1.53 | 1.53 | | | | 0 | 36 | 28 | 4.5 | □ |
| Example 2 | | 2 | 1.53 | 1.38 | | | | 0.15 | 33 | 26 | 5.2 | □ |
| Example 3 | | 2 | 1.38 | 1.53 | | | | 0.15 | 36 | 28 | 4.3 | □ |
| Example 4 | | 3 | 1.53 | 1.38 | 1.53 | | | 0.15 | 47 | 38 | 3.0 | □ |
| Example 5 | | 3 | 1.53 | 1.46 | 1.53 | | | 0.07 | 39 | 31 | 4.3 | □ |
| Example 6 | | 3 | 1.53 | 1.49 | 1.53 | | | 0.04 | 37 | 30 | 4.8 | □ |
| Example 7 | | 3 | 1.94 | 1.38 | 1.94 | | | 0.56 | 63 | 52 | 1.7 | □ |
| Example 8 | | 4 | 1.53 | 1.38 | 1.53 | 1.38 | | 0.15 | 40 | 33 | 3.8 | □ |
| Example 9 | | 5 | 1.53 | 1.38 | 1.53 | 1.38 | 1.53 | 0.15 | 58 | 42 | 2.2 | □ |
| Example 10 | Haze PET | 1 | 1.53 | | | | | — | 109 | 49 | 1.8 | ○ |
| Example 11 | | 2 | 1.53 | 1.38 | | | | 0.15 | 92 | 40 | 2.1 | □ |
| Comparative Example 1 | PET | 1 | 1.53 | | | | | — | 36 | 28 | 4.5 | X |
| Comparative Example 2 | | 1 | 1.43 | | | | | — | 34 | 27 | 4.9 | X |
| Comparative Example 3 | | 1 | 1.38 | | | | | — | 33 | 26 | 5.2 | X |

Observations on the results of evaluation are as follows.

In Example 1, an anisotropic light diffusion sheet could be obtained such that the diffusion angle in the horizontal direction was 36° and the diffusion angle in the vertical direction was 28°, and further the defect site in the first light diffusion d caused due to, for example, bubbles contained in the uncured resin before irradiation with ultraviolet light, and, when the light diffusion sheet having an aluminum sheet attached was used as a reflective screen as mentioned above and the image was observed from the position of regular reflection, it was confirmed that the defect portion was in a non-diffusion state and hence the reflection of the light source was directly observed to cause glare.

Further, from the Comparative Examples, it is found that the light diffusion sheet having only one light diffusion layer has a narrow range of controlling the diffusion angle, which is difficult to meet the various requirements of diffusing power.

With respect to the light diffusion sheet of a three-layer structure, a comparison is made between Example 5 in which the difference in refractive index between the adjacent light diffusion layers is 0.07, Example 6 in which the difference is 0.04, and Comparative Example 1 in which an example of a light diffusion sheet in the past is used. There is only a small difference in the diffusion angle between Example 6 and Comparative Example 1, but the diffusion properties in Example 5 in which the difference in refractive index is 0.07 are distinctly different from others. Thus, for controlling the diffusion properties of a light diffusion sheet including the small number of stacked layers, it is advantageous that the difference in refractive index between the layers is larger.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A light diffusion sheet comprising:
    a substrate; and
    at least two light diffusion layers each having a continuously uneven surface stacked directly on the substrate,
    wherein at least one light diffusion layer is anisotropic in diffusion property in longitudinal and lateral directions, and a luminance peak is at an angle in the direction of a middle portion of the light diffusion sheet and the angle is continuously increased in the direction from the middle portion to a periphery portion of the light diffusion sheet.

2. The light diffusion sheet according to claim 1, wherein: the uneven surface has a same uneven form for each of the light diffusion layers.

3. The light diffusion sheet according to claim 1, wherein: refractive indexes of adjacent light diffusion layers are different from one another.

4. The light diffusion sheet according to claim 1, wherein: a high refractive-index light diffusion layer and a low refractive-index light diffusion layer are alternately stacked, the low refractive-index light diffusion layer having a refractive index lower than that of the high refractive-index light diffusion layer.

5. The light diffusion sheet according to claim 4, wherein: a diffusion angle of the light diffusion sheet is controlled by adjusting at least one of a number of the stacked light diffusion layers and a difference in refractive index between the adjacent light diffusion layers or both.

6. The light diffusion sheet according to claim 5 wherein: each difference in refractive index between the adjacent light diffusion layers is about 0.07 or more.

7. The light diffusion sheet according to claim 4, wherein: an outermost layer of the light diffusion layer is a low refractive-index layer.

8. The light diffusion sheet according to claim 4, wherein: an outermost layer of the light diffusion layer is a high refractive-index layer.

9. A light diffusion sheet comprising:
    a base material capable of transmitting light and diffusing the transmitted light; and
    a light diffusion layer, formed directly on the base material, having a continuously uneven surface,
    wherein the light diffusion sheet is anisotropic in diffusion property in perpendicular and horizontal directions, and a luminance peak is at an angle in the direction of a middle portion of the light diffusion sheet and the angle is continuously increased in the direction from the middle portion to a periphery portion of the light diffusion sheet.

10. The light diffusion sheet according to claim 9, wherein: the diffusion angle of the reflected light or transmitted light in the perpendicular direction is smaller, and the diffusion angle in the horizontal direction is larger.

* * * * *